Jan. 6, 1953  M. O. HERZOG  2,624,536
ROD HOLDER
Filed Nov. 7, 1950
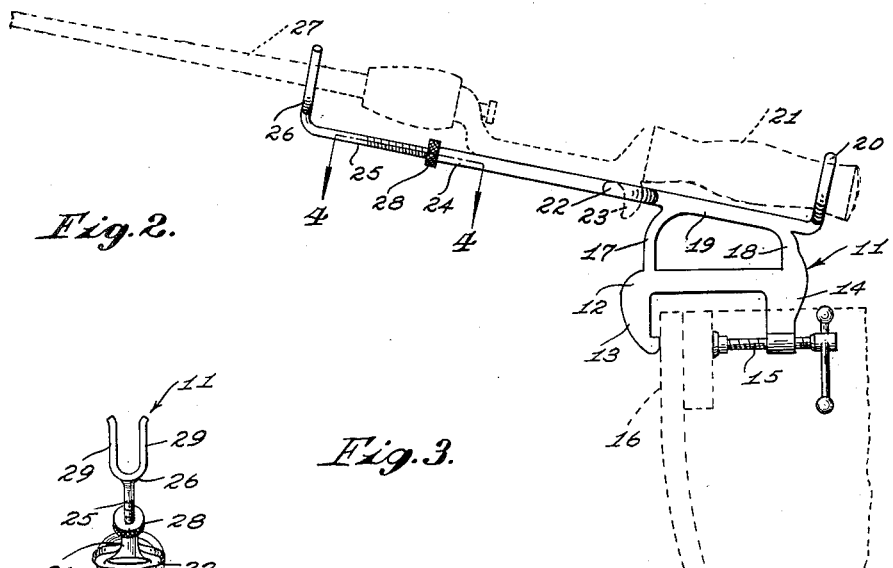
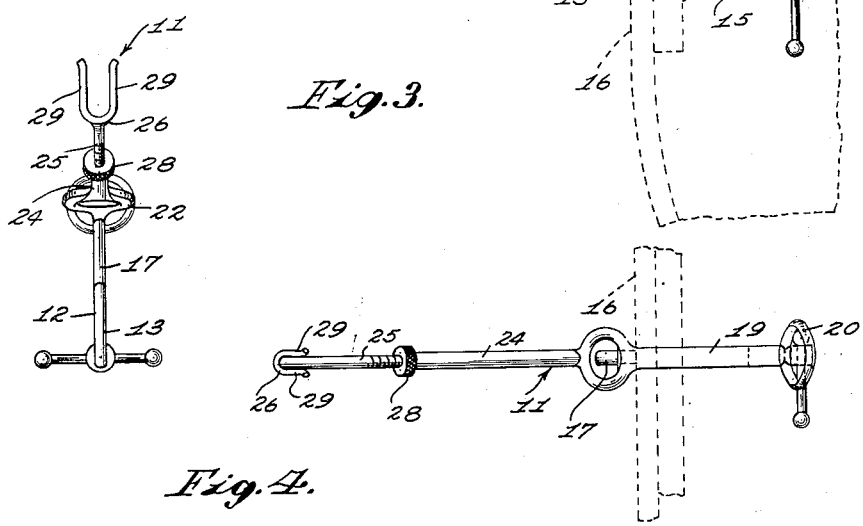
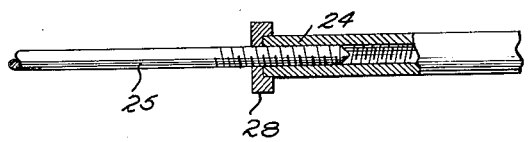
INVENTOR.
MARTIN O. HERZOG
BY
McMorrow, Berman & Davidson
ATTORNEYS Patented Jan. 6, 1953

2,624,536

UNITED STATES PATENT OFFICE 2,624,536

ROD HOLDER

Martin O. Herzog, Fort Hood, Tex.

Application November 7, 1950, Serial No. 194,436

3 Claims. (Cl. 248—42)

This invention relates to fishing rod holders, and more particularly to a fishing rod holder of the adjustable type adapted to be secured to a boat side or other suitable support for holding a fishing rod.

A main object of the invention is to provide a novel and improved fishing rod holder which is very simple in construction, which is very easy to attach to a support, such as the side of a boat, and which is readily adjustable in accordance with different sizes of fishing rods.

A further object of the invention is to provide an improved fishing rod holder which is very inexpensive to manufacture, which is very easy to adjust to support a fishing rod of any size, which securely holds the fishing rod against rotation or tipping, and from which the fishing rod may be disengaged in one motion.

Further objects and advantages of the invention will become apparent from the following description and claims, and from the accompanying drawings, wherein:

Figure 1 is a side elevational view of an improved fishing rod holder constructed in accordance with the present invention illustrating the manner of use thereof;

Figure 2 is a front end view of the fishing rod holder of Figure 1;

Figure 3 is a top view of the fishing rod holder of Figure 1;

Figure 4 is an enlarged cross-section detail view taken on line 4—4 of Figure 1.

Referring to the drawings, the fishing rod holder is designated generally at 11 and comprises a main body portion 12 which includes the depending jaws 13 and 14, the jaw 14 being provided with a clamping screw 15 threaded therethrough which extends toward the jaw 13 and which is adapted to cooperate therewith for clamping the body 12 to a suitable support, such as the side of a boat 16, shown in dotted view in Figure 1. The body 12 is formed with the upstanding integral support elements 17 and 18, and integrally secured to the top portions of said support elements is the upwardly and forwardly inclined arm 19. The rear end of the arm 19 is formed with the upstanding ring member 20, adapted to receive the end of the handle 21 of a fishing rod, shown in dotted view in Figure 1, and the intermediate portion of the arm 19 is integrally formed with the ring element 22 adapted to receive the depending finger grip portion 23 of a fishing rod. The forward portion of the arm is tubular, as shown at 24, and threadedly engaged therein is a rod member 25. Rod member 25 is formed at its forward end with the upstanding fork 26 adapted to receive the shank portion 27 of a fishing rod, as shown in Figure 1. Threadedly engaged on the rod 25 is the knurled lock nut 28 which is engageable with the end of the tubular portion 24 to lock the rod member 25 in an adjusted position. As shown in Figure 2, the fork 26 comprises the upstanding finger elements 29, 29 which are spaced apart and which receive the shank 27 of the fishing rod therebetween.

In use of the device, the body 12 is secured to the side of a boat or any other suitable stationary support by means of the clamping screw 15 in cooperation with the clamping jaw 13, and the fishing rod is inserted in the support in the manner shown in Figure 1, with the handle 21 of the rod received in the ring 20, with the depending finger grip 23 received in the ring 22, and with the shank portion of the rod 27 received in the fork 26. For variations in size of fishing rods, the position of the fork 26 may be adjusted by unfastening the knurled locking nut 28 and rotating the rod 25 until the fork 26 is located in the correct position to receive the shank portion of the fishing rod, whereupon the lock nut 28 is tightened to secure the rod 25 in the desired adjusted position. The engagement of the finger grip portion 23 in the ring 22 effectively anchors the rod against rotating, and the engagement of the handle 21 in the ring 20 effectively prevents tipping of the rod when it is in the support.

While a specific embodiment of an improved fishing rod holder has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing rod holder of the character described comprising a main body portion, a screw clamp on said main body portion adapted to secure said main body portion to a support, an inclined arm on said main body portion, a rod member adjustably connected to the end of said arm for longitudinal adjustment along the axis of said arm, an upstanding fork on the end of said rod member adapted to receive the shank of a fishing rod, and an upstanding transverse ring on the end of said arm opposite said rod member extending normal to the axis of said arm and being adapted to receive the handle of a fishing rod, the intermediate portion of said arm being formed with an aperture adapted to receive the depending finger grip of a fishing rod to hold said fishing rod against rotation.

2. A fishing rod holder of the character described comprising a main body portion, a screw clamp on said main body portion adapted to secure said main body portion to a support, an inclined arm on said main body portion, a rod member threadedly engaged in said arm for longitudinal adjustment along the axis of said arm, a lock nut threaded on said rod member and being lockingly engageable with the end of said arm, an upstanding fork on the end of said rod member adapted to receive the shank of a fishing rod, and an upstanding transverse ring on the end of said arm opposite said rod member extending normal to the axis of said arm and being adapted to receive the handle of a fishing rod, the intermediate portion of said arm being formed with an aperture adapted to receive the depending finger grip of a fishing rod to hold said fishing rod against rotation.

3. A fishing rod holder of the character described comprising a main body portion, a screw clamp on said main body portion adapted to secure said main body portion to a support, an inclined arm on said main body portion, a rod member threadedly engaged in said arm for longitudinal adjustment along the axis of said arm, a lock nut threaded on said rod member and being lockingly engageable with the end of said arm, an upstanding transverse fork on the end of said rod member extending normal to the axis of said arm and adapted to receive the shank of a fishing rod, an upstanding transverse ring on the end of said arm opposite said rod member extending transverse to said axis and being adapted to receive the handle of a fishing rod, and a ring member integrally formed in the intermediate portion of said arm including said axis and being normal to the plane of said fork, said last named ring member being adapted to receive the depending finger grip of a fishing rod to hold said fishing rod against rotation.

MARTIN O. HERZOG.

REFERENCES CITED

The following references are of record in the file of this patent:

UNITED STATES PATENTS

| Number | Name | Date |
| --- | --- | --- |
| 503,338 | Woods | Aug. 14, 1893 |
| 1,529,265 | Merckel | Mar. 10, 1925 |
| 1,703,554 | Slanter | Feb. 26, 1929 |
| 1,788,536 | Merckel | Jan. 13, 1931 |
| 2,481,118 | Johns | Sept. 6, 1949 |
| 2,518,908 | Korns | Aug. 15, 1950 |